United States Patent
Wanami

(10) Patent No.: US 8,996,199 B2
(45) Date of Patent: Mar. 31, 2015

(54) VEHICLE ACCIDENT HISTORY RECORDER

(71) Applicant: Denso Corporation, Kariya, Aichi-pref. (JP)

(72) Inventor: Shingo Wanami, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/533,130

(22) Filed: Nov. 5, 2014

(65) Prior Publication Data

US 2015/0051789 A1 Feb. 19, 2015

Related U.S. Application Data

(62) Division of application No. 14/154,476, filed on Jan. 14, 2014, now Pat. No. 8,935,013.

(51) Int. Cl.
*B60R 21/01* (2006.01)
*G07C 5/08* (2006.01)

(52) U.S. Cl.
CPC ............... *B60R 21/01* (2013.01); *G07C 5/085* (2013.01)
USPC .............................................. 701/1; 340/436

(58) Field of Classification Search
None
See application file for complete search history.

(56) References Cited

U.S. PATENT DOCUMENTS

| | | | | |
|---|---|---|---|---|
| 6,741,168 B2* | 5/2004 | Webb et al. | ............ | 340/436 |
| 7,698,086 B2* | 4/2010 | Kidd et al. | ............ | 702/113 |
| 8,026,799 B2* | 9/2011 | Isaji et al. | ............ | 340/435 |
| 2002/0103622 A1* | 8/2002 | Burge | ............ | 702/183 |
| 2002/0183905 A1* | 12/2002 | Maeda et al. | ............ | 701/35 |
| 2004/0189454 A1* | 9/2004 | Shimoyama | ............ | 340/436 |
| 2004/0254729 A1* | 12/2004 | Browne et al. | ............ | 701/301 |
| 2005/0080530 A1* | 4/2005 | Arduc et al. | ............ | 701/37 |
| 2006/0100762 A1* | 5/2006 | Matsunaga et al. | ............ | 701/45 |
| 2007/0035182 A1* | 2/2007 | Wellhoefer et al. | ............ | 307/120 |
| 2007/0106474 A1* | 5/2007 | Ide | ............ | 701/301 |
| 2007/0150140 A1* | 6/2007 | Seymour | ............ | 701/35 |
| 2008/0048850 A1* | 2/2008 | Yamada | ............ | 340/439 |
| 2008/0059054 A1* | 3/2008 | Yamada | ............ | 701/200 |
| 2010/0198446 A1* | 8/2010 | Erb et al. | ............ | 701/29 |
| 2010/0228432 A1* | 9/2010 | Smith et al. | ............ | 701/35 |
| 2010/0305812 A1* | 12/2010 | Nagao | ............ | 701/35 |
| 2010/0305818 A1* | 12/2010 | Doerr et al. | ............ | 701/46 |
| 2010/0324774 A1* | 12/2010 | Bouni et al. | ............ | 701/29 |
| 2011/0153164 A1* | 6/2011 | Hiemer et al. | ............ | 701/45 |
| 2011/0202241 A1* | 8/2011 | Le et al. | ............ | 701/46 |
| 2011/0264395 A1* | 10/2011 | Smith et al. | ............ | 702/113 |

(Continued)

FOREIGN PATENT DOCUMENTS

| | | |
|---|---|---|
| JP | 09-257495 | 10/1997 |
| JP | 2007-176307 | 7/2007 |

*Primary Examiner* — Jonathan M Dager
(74) *Attorney, Agent, or Firm* — Harness, Dickey & Pierce, PLC

(57) ABSTRACT

A vehicle accident history recorder is provided. The vehicle accident history recorder comprises: a collision detection sensor for detecting a collision of a vehicle; a collision determination section for determining an occurrence of the collision based on a detection result of the collision detection sensor; a yaw rate sensor for detecting a yaw rate of the vehicle; a damaged portion determination section for determining a damaged portion of the vehicle in the collision based on the detection result of the collision detection sensor and a detection result of the yaw rate sensor when the collision determination section determines the occurrence of the collision; and a storage device for storing a determination result of the damaged portion determination section in a readable form.

5 Claims, 3 Drawing Sheets

(56) References Cited

U.S. PATENT DOCUMENTS

| | | | |
|---|---|---|---|
| 2011/0304447 A1* | 12/2011 | Marumoto | 340/438 |
| 2012/0197481 A1* | 8/2012 | Takeda | 701/31.4 |
| 2012/0265406 A1* | 10/2012 | Lang et al. | 701/45 |
| 2012/0277987 A1* | 11/2012 | Marumoto | 701/123 |
| 2013/0124052 A1* | 5/2013 | Hahne | 701/46 |
| 2013/0320654 A1* | 12/2013 | Clark et al. | 280/735 |
| 2014/0180530 A1* | 6/2014 | Wanami | 701/32.2 |
| 2014/0200738 A1* | 7/2014 | Wanami | 701/1 |

* cited by examiner

FIG. 3
| | | GYRO RESULT | | |
|---|---|---|---|---|
| | | C CLKWS | CLKWS | NO ROATE |
| ACCEL RESULT | F FACE | F FACE / L PART | F FACE / R PART | F FACE / C PART |
| | R FACE | R FACE / F PART | R FACE / B PART | R FACE / C PART |
| | L FACE | L FACE / B PART | L FACE / F PART | L FACE / C PART |
| | B FACE | B FACE / R PART | B FACE / L PART | B FACE / C PART |
FIG. 4
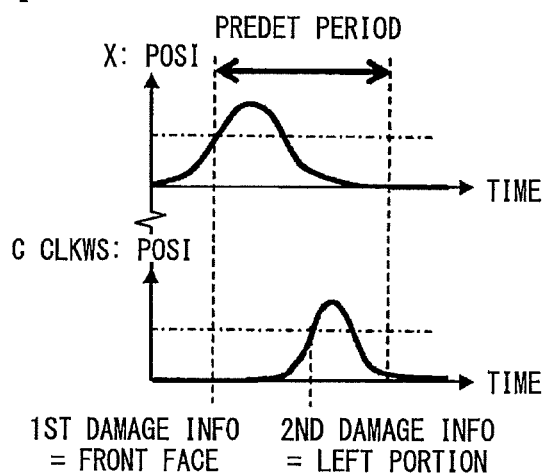
FIG. 5
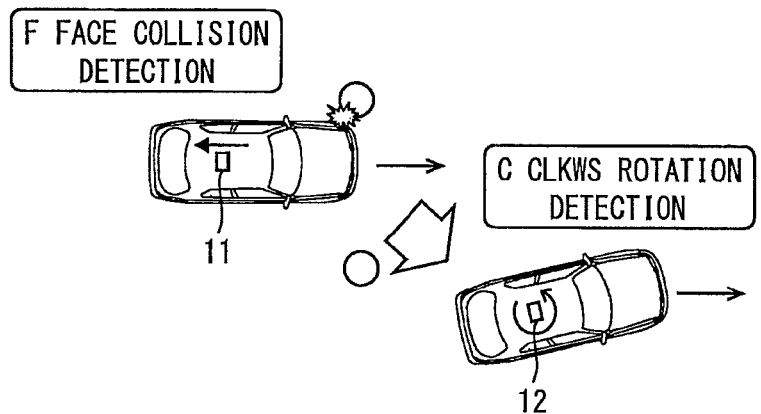

VEHICLE ACCIDENT HISTORY RECORDER

CROSS REFERENCE TO RELATED APPLICATION

This application is a divisional of U.S. patent application Ser. No. 14/154,476 filed on Jan. 14, 2014. The present application is based on and claims priority to Japanese Patent Applications No. 2013-6383 filed on Jan. 17, 2013, disclosure of which is incorporated herein by reference.

TECHNICAL FIELD

The present disclosure relates to a vehicle accident history recorder for recording a collision accident of a vehicle.

BACKGROUND

According to a vehicular accident situation recorder of Patent Document 1, when an acceleration sensor and a yaw rate sensor output signals exceeding thresholds, the vehicular accident situation recorder determines that a collision accident causing a yaw rate of the vehicle has occurred. When the above determination is made, the vehicular accident situation recorder transfers a video data representing a vehicle outside situation and records the video data in a storage device. Additionally, the vehicular accident situation recorder records detection data of the acceleration sensor, the yaw rate sensor and other devices in the storage device.

Patent Document 1: JP-H9-257495A

However, the above-described recorder does not identify a damaged portion (collided portion) of the vehicle in the collision accident. The inventor of the present application believes that if the damaged portion were identified to some extents, a vehicle dealer would easily trade the vehicle and assess a purchasing price and accurately and quickly perform the assessment. While an accident history and a repair history should be investigated for service improvement, the dealer who overlooks the accident history and unsuccessfully performs proper assessment would lose his credit.

SUMMARY

The present disclosure is made in view of the foregoing. It is an object of the present disclosure to provide a vehicle accident history recorder that can determine a damaged portion of a vehicle in a collision and that can store a determination result in a readable form.

According to one example of embodiments, a vehicle accident history recorder is provided. The vehicle accident history recorder comprises: a collision detection sensor for detecting a collision of a vehicle; a collision determination section for determining an occurrence of the collision based on a detection result of the collision detection sensor; a yaw rate sensor for detecting a yaw rate of the vehicle; a damaged portion determination section for determining a damaged portion of the vehicle in the collision based on the detection result of the collision detection sensor and a detection result of the yaw rate sensor when the collision determination section determines the occurrence of the collision; and a storage device for storing a determination result of the damaged portion determination section in a readable form.

According the above configuration, by taking into account behavior of the vehicle after the collision, the vehicle accident history recorder can narrow down and identify the damaged portion in the collision based on a combination of a detection result of the acceleration sensor and a detection result of the yaw rate sensor. Additionally, information on the identified damaged portion is stored in the readable storage device. Because of this, a vehicle dealer can easily trade the vehicle and assess a purchasing price. The vehicle dealer can accurately and quickly perform the assessment.

BRIEF DESCRIPTION OF DRAWINGS

The above and other objects, features and advantages of the present disclosure will become more apparent from the following detailed description made with reference to the accompanying drawings. In the drawings:

FIG. 3 is a diagram illustrating determination criteria of a damaged portion determination section of the first embodiment;

FIG. 4 is a diagram illustrating a determination manner of the damaged portion determination section of the first embodiment;

FIG. 5 is a diagram illustrating a vehicle behavior after a collision;

DETAILED DESCRIPTION

Embodiments will be described with reference to the drawings. In the below embodiments, like references are used to refer to like parts. It is noted that the drawings are conceptual diagrams.

First Embodiment

Figure 1:
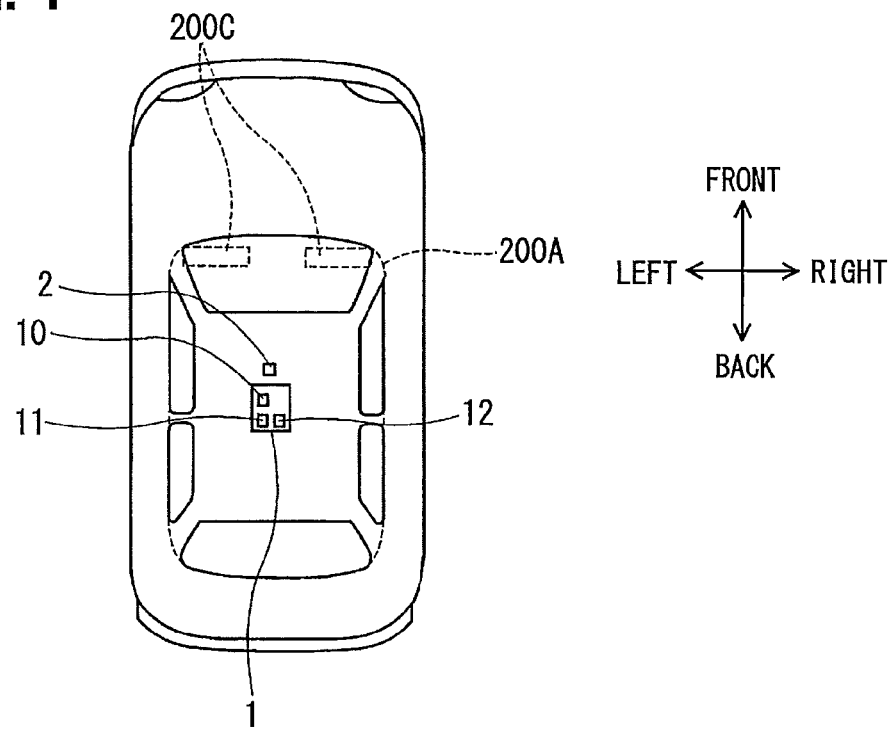
FIG. 1 is a diagram illustrating a vehicle accident history recorder in a vehicle of a first embodiment.

A vehicle accident history recorder of the first embodiment includes an airbag ECU 1 and a storage device 2, as shown in FIG. 1. The airbag ECU 1 is an electronic control unit for controlling deployment of an airbag 200C, which is an occupant protection device. The airbag ECU 1 is disposed at a position that is not exposed to a boarding space in a vehicle compartment 200A. For example, the airbag ECU 1 may be disposed in a space below an air conditioner operation panel. The airbag ECU 1 may be disposed in a center portion of the vehicle. Another in-vehicle ECU may be used in place of the airbag ECU 1.

The airbag ECU 1 includes a microcomputer 10, an acceleration sensor 11 (corresponding to an example of collision detection sensor), and a gyro sensor 12 (corresponding to an example of yaw rate sensor). The microcomputer 10 may include an electronic circuit, a memory and the like.

The acceleration sensor 11 is a G sensor for detecting acceleration in a vehicle front-back direction (i.e., vehicle front or back direction) and a vehicle left-right direction (i.e., vehicle left or right direction). A detection result of the acceleration sensor 11 is used for the control of deployment of the airbag 200C and the like. The microcomputer 10 controls the deployment of the airbag 200C and the like based on the detection result of the acceleration sensor 11. The gyro sensor 12 detects a yaw rate (angular velocity around a yaw axis), a roll rate (angular velocity around a roll axis), and a pitch rate (angular velocity around a pitch axis). That is, the gyro sensor 12 includes a yaw rate sensor.

Figure 2:
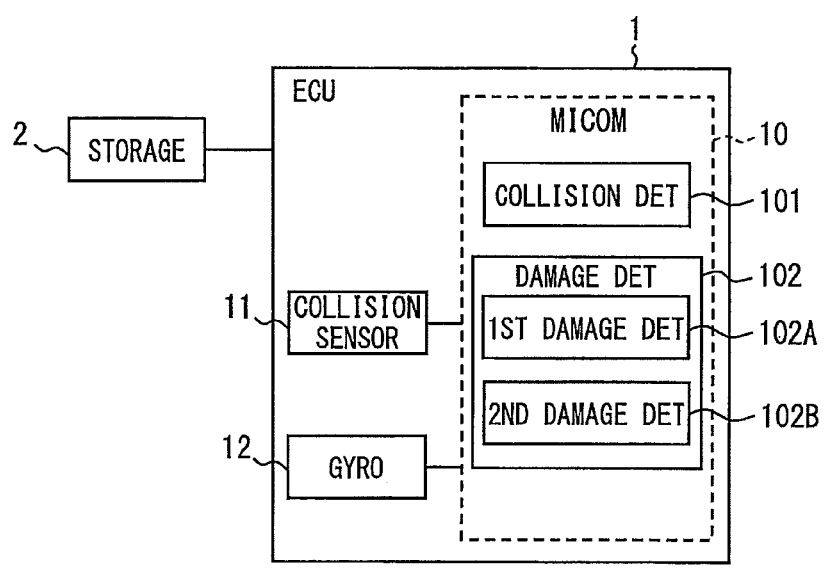
FIG. 2 is a block diagram illustrating a configuration of the vehicle accident history recorder of the first embodiment.

As shown in FIG. 2, the airbag ECU 1 includes a collision determination section 101 and a damaged portion determination section 102 in addition to a section for airbag control. These sections may be functional blocks implemented by the microcomputer 10. The collision determination section 101 determines whether the collision has occurred, based on a detection result of the acceleration sensor 11. Specifically, the collision determination section 101 stores a predetermined threshold (a collision threshold). When an absolute value of the detection result of the acceleration sensor 11 exceeds the threshold, the collision determination section 101 determines an occurrence of the collision.

When the collision determination section 101 determines the occurrence of the collision, the damaged portion determination section 102 determines a damaged portion of the vehicle in the collision based on the detection results of the acceleration sensor 11 and the gyro sensor 12. Specifically, the damaged portion determination section 102 includes a first damage determination section 102A and a second damage determination section 102B.

Based on the detection result of the acceleration sensor 11, the first damage determination section 102A identifies which of a front face, a back face, a left face and a right face of the vehicle is a damaged face of the vehicle. When the acceleration in the vehicle front-back direction exceeds the collision threshold, the first damage determination section 102A identifies whether the collision has occurred in the front face or the back face of the vehicle. This identification is made based on a polarity (plus or minus) of change in the acceleration in the vehicle front-back direction. When the acceleration in the vehicle left-right direction exceeds the collision threshold, the first damage determination section 102A identifies whether the collision has occurred in the right face or the left face of the vehicle. This identification is made based on a polarity (plus or minus) of change in the acceleration in the vehicle right-to-left direction. In this way, the first damage determination section 102A determines a first damage information and records the first damage information (determination result) in the storage device 2, so that the first damage information identifies one of the front face, the back face, the left face and the right face of the vehicle as a damaged face.

Based on the first damage information and information on the yaw rate of the gyro sensor 12, the second damage determination section 102B identifies the damaged portion in more detail from the damaged face (collided surface) identified in the first damage information. Specifically, the second damage determination section 102B determines whether the collision rotates the vehicle clockwise, rotates the vehicle counterclockwise or does not rotate the vehicle. This determination is made based on the yaw rate detected within a predetermined time period from the occurrence of the collision determined by the collision determination section 101.

As shown in FIG. 3, based on the damaged face (the first damage information) and the rotation information (the yaw rate), the second damage determination section 102B identifies which of the following portions is the damaged portion: a right portion of the front face; a left portion of the front face; a center portion of the front face (or a whole front face); a right portion of the back face; a left portion of the back face; a center portion of the back face (or whole back face); a front portion of the right face; a back portion of the right face; a center portion of the right face (a whole right face); a front portion of the left face; a back portion of the left face; and a center portion of the left face (or a whole left face).

Specifically, when the front face or the back face of the vehicle is identified as the damaged face in the first damage information, the second damage determination section 102B determines a second damage information, so that the second damage information identifies one of a left portion, a right portion and a center portion of the damaged face as the damaged portion. When the left face or the right face of the vehicle is identified as the damaged face in the first damage information, the second damage determination section 102B determines the second damage information, so that the second damage information identifies one a front portion, a back portion and a center portion of the damaged face is the damaged portion. The second damage determination section 102B records the second damage information (determination result) in the storage device 2. It is noted that when the center portion is identified as the damaged portion, information (the second damage information) indicating the center portion or a whole face as the damaged portion may be stored in the storage device 2.

More specifically, when the front face or the back face is identified as the damaged face in the first damage information, the second damage information specifies one of multiple portions of the damaged face as the damaged portion by dividing the damaged face in the multiple portions in the vehicle left-right direction (the right portion, the left portion and the center portion in the present embodiment). When the left face or the right face is identified as the damaged face in the first damage information, the second damage information specifies one of multiple portions of the damaged face as the damaged portion by dividing the damaged face into the multiple portions in the vehicle front-back direction (the front portion, the back portion and the center portion in the present embodiment). It is noted that the multiple portions of the damaged face may be two portions which are right and left portions or front or back portions.

FIG. 4 illustrates an example of the determination of the damaged portion determination section 102. As shown in FIG. 4, when the acceleration sensor 11 detects the acceleration in the vehicle back direction exceeding the collision threshold and the gyro sensor 12 detects the counterclockwise rotation within the predetermined time period, the first damage determination section 102A determines that the front face is the damaged face and the second damage determination section 102B determines that the damaged portion is the left portion. That is, the second damage determination section 102B identifies the left portion of the front face as the damaged portion.

FIG. 5 illustrates an example of the behavior of the vehicle after the collision. As shown in FIG. 5, when the vehicle traveling forward collides with a forward object, the vehicle decelerates because of an increase in acceleration in the vehicle back direction, and thereafter, the vehicle rotates counterclockwise because of a forward movement of the right portion of the vehicle. In another example, when the yaw rate is not detected with the gyro sensor 12 or when the yaw rate greater than or equal to a predetermined threshold (see the one-dotted dashed line in FIG. 4) is not detected with the gyro sensor 12, it can be estimated that the vehicle after the collision does not rotate and that the collided portion is a center portion of the damaged face or a whole damaged face. In the first embodiment, the behavior of the vehicle after the collision is prospectively estimated for each face (damaged face). This estimated behavior is compared with a combination of a detection result of the acceleration sensor 11 and a detection result of the gyro sensor 12. Thereby, the damaged portion is identified.

As shown in FIG. 3, in the present embodiment, when the acceleration in the vehicle back direction increases, the damaged portion determination section 102 determines that the front face has the damaged portion. Thereafter, based on the rotation of the vehicle detected within the predetermined time period, the damaged portion is determined. Specifically, when the counterclockwise rotation is detected, the damaged portion is determined to be the left portion. When the clockwise rotation is detected, the damaged portion is determined to be the right portion. When the rotation greater than or equal to the threshold is not detected, the damaged portion is determined to be the center portion.

When the acceleration in the vehicle front direction increases, the damaged portion determination section 102 determines that the back face has the damaged portion. Thereafter, based on the rotation of the vehicle detected within the predetermined time period, the damaged portion is determined. Specifically, when the counterclockwise rotation is detected, the damaged portion is determined to be the right portion. When the clockwise rotation is detected, the damaged portion is determined to be the left portion. When the rotation greater than or equal to the threshold is not detected, the damaged portion is determined to be the center portion.

When the acceleration in the vehicle left direction increases, the damaged portion determination section 102 determines that the right face has the damaged portion. Thereafter, based on the rotation of the vehicle detected within the predetermined time period, the damaged portion is determined. Specifically, when the counterclockwise rotation is detected, the damaged portion is determined to be the front portion. When the clockwise rotation is detected, the damaged portion is determined to be the back portion. When the rotation greater than or equal to the threshold is not detected, the damaged portion is determined to be the center portion.

When the acceleration in the vehicle right direction increases, the damaged portion determination section 102 determines that the left face has the damaged portion. Thereafter, based on the rotation of the vehicle detected within the predetermined time period, the damaged portion is determined. Specifically, when the counterclockwise rotation is detected, the damaged portion is determined to be the back portion. When the clockwise rotation is detected, the damaged portion is determined to be the front portion. When the rotation greater than or equal to the threshold is not detected, the damaged portion is determined to be the center portion.

The storage device 2 includes a non-volatile memory. The storage device 2 is communicably connected with the airbag ECU 1. The storage device 2 is arranged around the airbag ECU 1. The information on the damaged portion (the first damage information and the second damage information) transmitted from the airbag ECU 1 is recorded in the storage device 2, so that the recorded data is stored in a readable form. The information stored in the storage device 2 can be read and displayed with a computer terminal (e.g., personal computer, tablet) via a detachable storage device such as a USB memory or the like or via a wire such as a USB cable or the like. The storage device 2 stores the recorded data together with, for example, day-time information. It may be preferable that the recorded data in a storage device of the storage device 2 be inerasable and non-modifiable. For example, the storage device may include a ROM.

According to the first embodiment, by taking into account the behavior of the vehicle after the collision, the vehicle accident history recorder can narrow down and identify the damaged portion in the collision based on a combination of the detection result of the acceleration sensor 11 and the detection result of the yaw rate of the gyro sensor 12. Additionally, according to the first embodiment, the damaged face (one of the four faces) is identified with the acceleration sensor 11 in relatively a rough way. Then, one of the right portion, the left portion and the center portion of the damaged face, or, one of the front portion, the back portion and the center portion of the damaged face is identified as the damaged portion by using the gyro sensor 12. In this way, it is possible to identify a damaged site in detail.

According to the first embodiment, the first damage information specifying the damaged face and the second damage information specifying the damaged portion of the damaged face are accumulated and stored in the storage device 2. Therefore, as to the vehicle equipped with the vehicle accident history recorder, one can read the data from the storage device 2 and access an accident history of the vehicle (damaged portion identified in past). Because of this, the vehicle dealer can easily trade the vehicle and assess a purchasing price. The vehicle dealer can accurately and quickly perform the assessment.

Second Embodiment

A vehicle accident history recorder of the second embodiment will be illustrated with reference to FIGS. 6 and 7. Like parts between the first and second embodiments are referred to by like references. Additionally, explanations on like parts already given above may be omitted.

Figure 6:
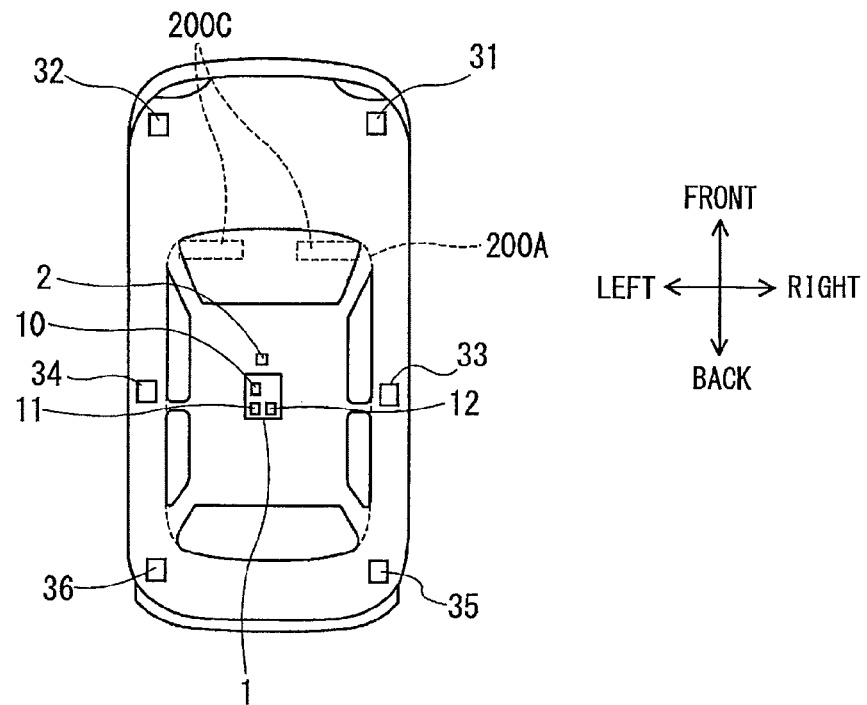
FIG. 6 is a diagram illustrating a vehicle accident history recorder in a vehicle of a second embodiment.
Figure 7:
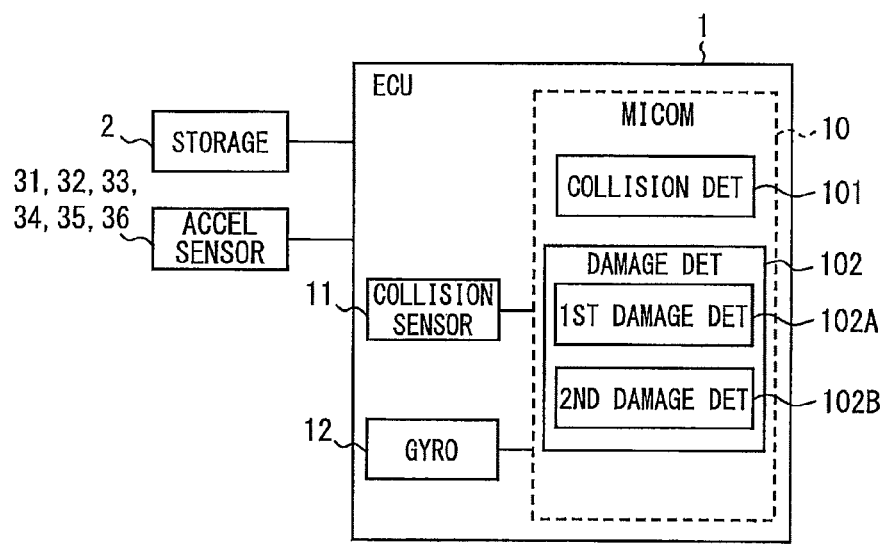
FIG. 7 is a block diagram illustrating a configuration of the vehicle accident history recorder of the second embodiment.

As shown in FIGS. 6 and 7, the vehicle accident history recorder of the second embodiment includes an airbag ECU 1, a storage device 2 and acceleration sensors 31 to 36. The acceleration sensors 31 to 36 are communicably connected to the airbag ECU 1.

The acceleration sensor 31 is disposed at a right portion of the front region of the vehicle and detects acceleration in the vehicle front-back direction and the vehicle left-right direction. The acceleration sensor 32 is disposed at a left portion of the front region of the vehicle and detects the acceleration in the vehicle front-back direction and the vehicle left-right direction. The acceleration sensor 33 is disposed at a right portion of a center region of the vehicle and detects the acceleration in the vehicle left-right direction. The acceleration sensor 34 is disposed at a left portion of the center region of the vehicle and detects the acceleration in the vehicle left-right direction. The acceleration sensor 35 is disposed at a right portion of a back region of the vehicle and detects the acceleration in the vehicle front-back direction and the vehicle left-right direction. The acceleration sensor 36 is disposed at a left portion of the back region of the vehicle and detects the acceleration in the vehicle front-back direction and the vehicle left-right direction.

The collision determination section 101 determines whether the collision has occurred, based on at least one of acceleration results of the acceleration sensor 31 to 36 and the acceleration sensor 11. In the second embodiment, the acceleration sensors 31 to 36 are used as satellite sensors for control of deployment of the airbag 200C. When the detection result of at least one of the acceleration sensor 31 to 36 exceeds the collision threshold and the detection result of the acceleration sensor 11 exceeds the collision threshold, the collision determination section 101 determines that the collision has occurred.

Like the first embodiment, when the collision determination section 101 determines that the collision has occurred, the damaged portion determination section 102 specifies the first damage information based on the detection result of the acceleration sensor 11 and specifies the second damage information based on the detection result of the gyro sensor 12. Thus, the second embodiment can provide the same advantages as the first embodiment. Additionally, in the second embodiment, since the damaged portion is identified when the detection result of the acceleration sensor 11 and the detection result of at least one of the acceleration sensors 31 to 36 exceed the collision thresholds and represent the same direction, the second embodiment improves reliability of information indicating the occurrence of the collision and the damaged portion.

(Modifications)

The above-illustrated embodiments do not limit embodiments of the present disclosure. Examples of other embodiments and modifications will be illustrated.

For example, an acceleration sensor for detecting acceleration in a vehicle front-back direction and a vehicle left-right direction may be a single acceleration sensor or multiple acceleration sensors, or may be a combination of an acceleration sensor for detecting acceleration in a vehicle front-back direction and an acceleration sensor for detection acceleration in a vehicle left-right direction. A yaw rate sensor may be provided to the airbag ECU 1 in place of the gyro sensor 12.

The damaged portion determination section 102 may generate a damage information indicating a damaged face and a damaged portion by combining the first damage information indicating the damaged face and the second damage information indicating the damaged portion. In other words, it may be suffice that the damage information recorded in the storage device 2 include the first damage information and the second damage information. The damaged portion determination section 102 may pre-store a map data (database or the like) representing a relation between vehicle behaviors and damaged portions. The damaged portion determination section 102 may determine the damaged portion by comparing the detection results of the sensors 11, 12 with the map data.

In another embodiment, a pressure sensor may be adopted as the collision detection sensor. In this case, for example, the collision detection sensor may include at least one of: a pressure sensor for detecting a pressure in a chamber arranged in a bumper of a vehicle front; a pressure sensor for detecting a pressure in a chamber arranged in a bumper of a vehicle back; a pressure sensor for detecting a pressure in a door of a vehicle right; and a pressure sensor for detecting a pressure in a door of a vehicle left. In this regard, the pressure sensor of the door may detect not all of side collisions.

In one embodiment, the acceleration sensor 11 may be an acceleration sensor for detecting only acceleration in a vehicle front-back direction. In this case, the damaged portion determination section 102 may identify one of the front face and the back face as the damaged face based on the detection result of the acceleration sensor 11 and further identify one of a right portion, left portion and a center portion (or a whole of the damaged face) of the damaged face as the damaged portion based on the detection result of the gyro sensor 12. Likewise, the acceleration sensor 11 may be an acceleration sensor for detecting only acceleration in a vehicle left-right direction. In this case, the damaged portion determination section 102 may identify one of the right face and the left face as the damaged face based on the detection result of the acceleration sensor 11 and further identify one of a front portion, back portion and a center portion (or a whole of the damaged face) of the damaged face (the left or right face) as the damaged portion based on the detection result of the gyro sensor 12. Thus, when the acceleration sensor 11 can detect acceleration in at least one of a vehicle front-back direction and a vehicle left-right direction, the damaged portion in the collision in the at least one of a vehicle front-back direction and a vehicle left-right direction can be identified.

In a modification of the second embodiment, the damaged portion determination section 102 may identify the damaged portion based on the detection result of the gyro sensor 12 and the detection results of the acceleration sensors 31 to 36 instead the detection result of the acceleration sensor 11. Since the acceleration sensors 31 to 36 are arranged near the four faces (which would become a damaged face), the collision can be detected with high sensitivity, and additionally, the magnitudes of the detection results of the acceleration sensors 31 to 36 can be used to identify the damaged portion. For example, when the acceleration sensor 31 detects a largest acceleration change among the acceleration sensors 31 to 36, it can be determined that an attachment position (right portion of the vehicle front) of the acceleration sensor 31 is highly likely the damaged portion, and additionally, it can further determined from a direction of the changed acceleration whether the damaged portion is in the front face or the right face of the vehicle. By combining this result with the rotation information of the yaw rate, a more accurate determination of the damaged portion can be made. Furthermore, by taking into account the detection results of the acceleration sensors 31 to 36, the damaged portion determination section 102 may identify the damaged portion based on three detection results. That is, a first detection result is a detection result of the acceleration sensor 11, a second detection result is detection results of the acceleration sensors 31 to 36, and a third detection result is a detection result of the gyro sensor 12.

It is assumed that a collision occurs in a situation where the vehicle is spinning (i.e., a yaw rate is detected). In this case, the collision determination section 101 determines whether or not the collision has occurred, and the damaged portion determination section 102 determines whether or not a change in yaw rate detected with the gyro sensor 12 is greater than or equal to a threshold. When the change in yaw rate is greater than or equal to the threshold, the damaged portion determination section 102 identifies the damaged portion based on a direction of the change and the detection result of the acceleration sensor 11 and/or the detection results of the acceleration sensors 31 to 36. In this way, based on the detection result of the gyro sensor 12 and the detection result of the acceleration sensor 11 (and/or the detection results of the acceleration sensors 31 to 36), the vehicle accident history recorder can identify and record the damaged portion.

Embodiments of the present disclosure are not limited the above embodiments and modifications. That is, the above embodiments and modifications thereof may be modified or combined in various ways without departing from the spirit and scope of the present disclosure.

What is claimed is:

1. A vehicle accident history recorder comprising:
a collision detection sensor for detecting a collision of a vehicle;
a collision determination section for determining an occurrence of the collision based on a detection result of the collision detection sensor;
a yaw rate sensor for detecting a yaw rate of the vehicle;
a damaged portion determination section for determining a damaged portion of the vehicle in the collision based on the detection result of the collision detection sensor and a detection result of the yaw rate sensor when the collision determination section determines the occurrence of the collision; and
a storage device for storing a determination result of the damaged portion determination section in a readable form, wherein:
the determination result of the damaged portion determination section includes
a first damage information that identifies whether or not a right face of the vehicle is a damaged face of the vehicle and that further identifies whether or not a left face of the vehicle is the damaged face of the vehicle, and a second damage information that, when the first damage information identifies the right face or the left face of the vehicle as the damaged face, identifies which of a plurality of portions of the damaged face is the damaged portion by dividing the damaged face into the plurality of portions in a vehicle front-back direction, and when the right face or the left face of the vehicle is identified as the damaged face, the damaged portion determination section determines which of the plurality of portions of the damaged face is the damaged portion in the collision, by using the detection result of the yaw rate sensor representing at least one of (i) a rotation direction of the vehicle and (ii) an absence of a rotation of the vehicle.

2. The vehicle accident history recorder according to claim 1, wherein:

when the right face or the left face of the vehicle is identified as the damaged face and the rotation of the vehicle is not detected by the yaw rate sensor, the damaged portion determination section determines that the damaged portion is a center portion of the damaged face.

3. The vehicle accident history recorder according to claim 1, wherein:

the collision detection sensor, which detects a side collision of the vehicle, is disposed at a center portion of the vehicle in the vehicle front-back direction.

4. The vehicle accident history recorder according to claim 3, wherein:

the collision detection sensor is disposed at the center portion of the vehicle in not only the vehicle front-back direction but also a vehicle left-right direction.

5. The vehicle accident history recorder according to claim 3, wherein:

the collision detection sensor is disposed at the center portion of the right or left face of the vehicle.

* * * * *

UNITED STATES PATENT AND TRADEMARK OFFICE
CERTIFICATE OF CORRECTION

| | |
|---|---|
| PATENT NO. | : 8,996,199 B2 |
| APPLICATION NO. | : 14/533130 |
| DATED | : March 31, 2015 |
| INVENTOR(S) | : Shingo Wanami |

It is certified that error appears in the above-identified patent and that said Letters Patent is hereby corrected as shown below:

Title Page, item (30) Foreign Application Priority Data was omitted, and should include --(30) Foreign Application Priority Data Jan. 17, 2013 (JP) 2013-006383--.

Signed and Sealed this
Eleventh Day of August, 2015

Michelle K. Lee
*Director of the United States Patent and Trademark Office*